(No Model.)
S. LOGAN.
BICYCLE BRAKE.
No. 567,650. Patented Sept. 15, 1896.
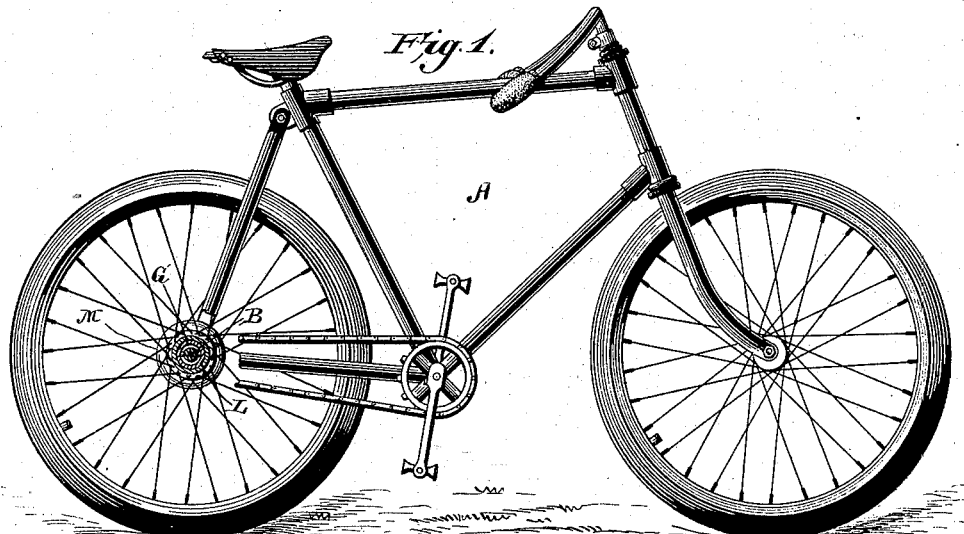
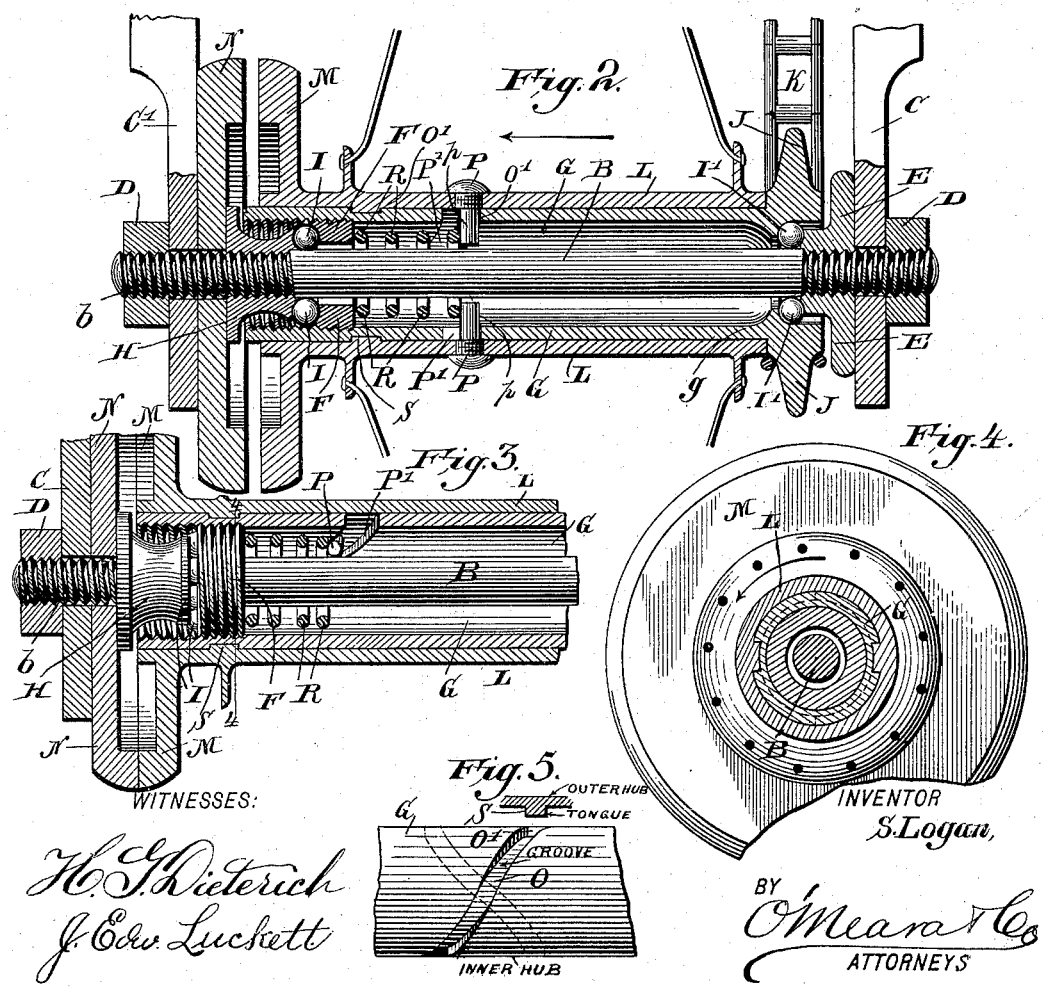
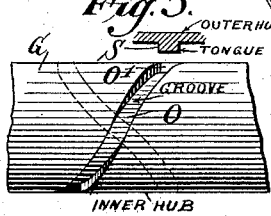
WITNESSES:
H. S. Dieterich
J. Edw. Luckett
INVENTOR
S. Logan,
BY
O'Meara & Co
ATTORNEYS

UNITED STATES PATENT OFFICE.

SYLVESTER LOGAN, OF EMLENTON, PENNSYLVANIA.

BICYCLE-BRAKE.

SPECIFICATION forming part of Letters Patent No. 567,650, dated September 15, 1896.

Application filed September 5, 1895. Serial No. 561,536. (No model.)

*To all whom it may concern:*

Be it known that I, SYLVESTER LOGAN, residing at Emlenton, in the county of Venango and State of Pennsylvania, have invented a new and Improved Bicycle-Brake, of which the following is a specification.

My invention relates more particularly to a brake mechanism mounted on the rear or drive axle which is adapted to be set in operation by back or impeded pedaling, and such invention primarily has for its object to provide a brake mechanism of this kind of a simple and inexpensive construction which can be readily applied to the ordinary makes of bicycles and which as soon as the pedal-pressure is impeded will move to an operative position, and when released from the impeded or back pressure action to automatically assume its normal position.

My invention also has for its object to provide a combined propulsion and brake mechanism for the drive-shaft, which, when in a normal condition, will be held locked with the hind or drive wheel and serve to propel same, and which, as back pressure is applied to the pedals, will, by the momentum of the said drive-wheel, be moved to a braking position.

With other minor objects in view, which will be hereinafter referred to, the invention consists in the peculiar combination and novel arrangement of parts such as will be first described in detail and then be specifically pointed out in the appended claims, reference being had to the accompanying drawings, in which—

Figure 1 is a side view of a bicycle, the rear axle being shown in section to illustrate the application of my invention. Fig. 2 is a horizontal section of the rear or drive axle with my improvements applied, the parts being shown in their normal or locked position. Fig. 3 is a detail section of the same, showing the parts moved up to a braking position. Fig. 4 is a cross-section taken on the line 4 4 of Fig. 3, and Fig. 5 is a detail view hereinafter specifically referred to.

Referring to the accompanying drawings, A indicates the bicycle, which, except so far as relates to the rear axle, the hub, and the adjacent frame-bearing portions, may be of any approved construction.

In my construction the rear-wheel hub and the axle are formed in the manner most clearly shown in Fig. 2, by reference to which it will be seen the axle proper, B, has its ends secured in the side frame members C C′, and is made fast by the nuts D D at one end, it having the ordinary ball-bearing holding-collar E, while at the opposite end it has a divided ball-bearing means consisting of an internal sleeve F, threaded into the internally-threaded end of an internal hub G, and a conical plug H, screwed onto the threaded end $b$ of the axle, between which and the sleeve F the balls I are held. The inner hub G is held to travel on the ball-bearings I I′, and carries at the end $g$ a drive-sprocket J, integrally formed therewith or made fast thereto, which sprocket is geared by the chain K with the drive sprocket-wheel on the crank-axle, as shown.

L indicates the wheel-hub proper, which is loosely mounted on the inner hub G, and while normally held in a locked condition with the said inner hub, to travel with it in unison, it is capable of moving independently thereon, as will presently appear. At one end the hub L has a friction-disk M, which is adapted to be moved into engagement with a similar disk N, fixedly held on the frame member C′, as shown. The inner hub G has a pair of spirally-arranged grooves O O, the pitch of which is toward the friction-disk end, as shown in Fig. 5, such grooves extending one-half (more or less) around the hub, as clearly shown in Fig. 4.

S′ S indicate spirally-arranged tongues formed on the outer hub L, which are adapted to engage the grooves O O, as clearly shown in Fig. 2.

P P indicate screw-plugs, which are secured to the outer hub and have shanks $p$ $p$, which project through openings P′ P′ into the interior of the inner hub, as shown.

R indicates a stout spiral spring disposed about the axle B and held to bear at one end against the sleeve E and at the other against the shanks $p$ $p$.

From the foregoing description, taken in connection with the drawings, it will be readily seen that the relation of the grooves in the inner hub, the tongues S, and the spring R is such as to normally force the tongues S S up into the outer or base ends O' O' of the grooves O and the outer hub to the position shown in Fig. 2, leaving, as it were, the two hubs G and L locked together, so that when power is applied to turn the sprocket J forward such hubs will turn together as a solid hub. Now should the rider wish to apply the brake it will be manifest that back or impeded pressure on the pedals will change the speed of rotation of the inner and outer hubs, and as the momentum of the rear wheel will continue to revolve the outer hub at its fast speed it follows that the said outer hub will rotate or crawl in a forward direction on the inner hub, and owing to the tongues and the grooves in the said inner hub it (the outer hub) will, as it thus rotates forward on the inner hub, be moved laterally on such hub in the direction indicated by the arrow and cause its disk M to engage the disk N and in consequence brake the wheel, it being obvious that as the back pressure on the pedals ceases the spring R will force the outer hub back to its normal position and lock the two hubs to rotate in unison. The spring R, it should be stated, also serves as a resistance-spring to prevent a too rapid application of the brake, and in practice such spring can be made of such a tension as found desirable for the particular kind of machine to which my brake devices are applied. Thus it will be seen that the back brake-pressure must be sufficient to overcome spring-resistance before the change of speed of the two hubs will cause the outer hub to shift. While the spring arrangement shown is preferred for practical use, it is obvious such arrangement may be omitted and other spring mechanism used for returning the outer hub to its normal position.

By my arrangement of brake mechanism on a bicycle a rider applies the brakes by foot-pressure and can quickly learn how to apply the brake quickly or slowly, as conditions may require. The mechanism can be easily applied to bicycle constructions now in common use without changing the appearance thereof or weakening the general structure.

Having thus described my invention, what I claim, and desire to obtain by Letters Patent, is—

1. In a bicycle-brake, the combination with a fixed friction-disk, the laterally-movable disk, the hub upon which it is mounted, the inner hub carrying the drive-sprocket, means arranged between the inner and outer hubs for shifting the latter laterally when the former one is retarded, said means including a spring mechanism for returning the outer hub to its normal position substantially as shown and described.

2. In a bicycle-brake the combination with the inner and outer hubs, of the spiral groove and tongues, the fixed friction-disk on the frame, the disk on the outer hub, the drive sprocket and chain all arranged substantially as shown and described.

3. In a bicycle-brake, the combination with the fixed disk, of the movable disk and outer hub having a spiral tongue, the inner hub having a spiral slot and a drive-sprocket the spiral spring and stops therefor all arranged substantially as shown and described.

4. As an improvement in bicycles, the combination with the rear-wheel axle, a drive-hub held to rotate thereon and geared with the crank-axle, the rear wheel having a hub member held to rotate on the drive-hub and movable laterally thereon, said hub having a friction-bearing disk at one end adapted to engage a fixed part of the frame when the hub is moved laterally, said wheel being arranged to move in unison with the drive-hub, when such drive-hub is propelled forward by pedal action and adapted to be moved forward and laterally on such drive-hub by the wheel momentum when the speed of the drive-hub is impeded, and to automatically resume its normal position when the speed of the said drive-hub, equals that of the wheel-hub as specified.

5. The combination with the rear-wheel axle the crank-axle and the inner hub G, and the fixed disk N, said hub G having oppositely-disposed diagonal grooves pitched toward the disk N of the wheel-hub H, held to partially rotate on the hub G, having disk M and diagonal tongues at one end, and stud-pins R, projected through slots in the inner hub and a spring held in the tubular hub to bear against the inner ends of the said stud-pins R, all arranged substantially as shown and described.

SYLVESTER LOGAN.

Witnesses:
I. G. BUTTERFIELD,
MERRICK DAVIDSON.